United States Patent
Hara et al.

(10) Patent No.: US 11,080,612 B2
(45) Date of Patent: *Aug. 3, 2021

(54) DETECTING ANOMALOUS SENSORS

(71) Applicant: INTERNATIONAL BUSINESS MACHINES CORPORATION, Armonk, NY (US)

(72) Inventors: Satoshi Hara, Tokyo (JP); Takayuki Katsuki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1291 days.

This patent is subject to a terminal disclaimer.

(21) Appl. No.: 14/984,873

(22) Filed: Dec. 30, 2015

(65) Prior Publication Data

US 2017/0193380 A1    Jul. 6, 2017

(51) Int. Cl.
*G06N 7/00*    (2006.01)

(52) U.S. Cl.
CPC .................... *G06N 7/005* (2013.01)

(58) Field of Classification Search
CPC .................... G06N 20/00
See application file for complete search history.

(56) References Cited

U.S. PATENT DOCUMENTS

| | | | |
|---|---|---|---|
| 6,415,276 B1 | 7/2002 | Heger et al. | |
| 8,041,997 B2 | 10/2011 | Park et al. | |
| 9,141,914 B2* | 9/2015 | Viswanathan | G06N 99/005 |
| 9,245,228 B1* | 1/2016 | Pihur | G06N 7/005 |
| 2012/0215450 A1 | 8/2012 | Ashok et al. | |
| 2014/0114153 A1 | 4/2014 | Bohm et al. | |
| 2015/0272509 A1* | 10/2015 | Kwon | A61B 5/7267 |
| | | | 600/518 |

OTHER PUBLICATIONS

Y. Zhang, N. Meratnia, and P. Havinga, "Outlier detection techniques for wireless sensor networks: A survey", IEEE Communications Surveys and Tutorials, vol. 12, No. 2, 2010, pp. 159-170. (Year: 2010).*

(Continued)

*Primary Examiner* — Vincent Gonzales
(74) *Attorney, Agent, or Firm* — Tutunjian & Bitetto, P.C.; Randall Bluestone

(57) ABSTRACT

Anomalous sensors are detected using an apparatus including a processor and one or more computer readable mediums collectively including instructions that, when executed by the processor, cause the processor to obtain a plurality of healthy sensor data, wherein each of the healthy sensor data includes a plurality of sensed values of a corresponding sensor among a plurality of sensors in normal operation, generate a healthy data distribution of at least two sensors among the plurality of sensors based on the plurality of healthy sensor data, and generate a function of a parameter probability distribution of the plurality of sensors under a condition of sensor data of the plurality of sensors based on the healthy data distribution, each parameter indicating whether the corresponding sensor is healthy or anomalous.

20 Claims, 7 Drawing Sheets

(56) References Cited

OTHER PUBLICATIONS

Khilar, Pabitra Mohan, and Sudipta Mahapatra. "Intermittent fault diagnosis in wireless sensor networks." 10th International Conference on Information Technology (ICIT 2007). IEEE, 2007. (Year: 2007).*

S.A. Aldosari and J. M. F. Moura, "Detection in decentralized sensor networks," 2004 IEEE International Conference on Acoustics, Speech, and Signal Processing, 2004, pp. 277-280. (Year: 2004).*

A. Mahapatro and P.M. Khilar, "Fault diagnosis in wireless sensor networks: A survey", IEEE Communications Surveys and Tutorials, vol. 15, No. 4, 2013, pp. 2000-2026. (Year: 2013).*

Chandola, Varun, Arindam Banerjee, and Vipin Kumar, "Anomaly detection: A survey", ACM Computing Surveys, 41.3, 58 pages, 2009. (Year: 2009).*

Jurdak, R., Wang, X.R., Obst, O. and Valencia, P., 2011. Wireless sensor network anomalies: Diagnosis and detection strategies. In Intelligence-Based Systems Engineering (pp. 309-325). Springer, Berlin, Heidelberg. (Year: 2011).*

Hill, D.J., Minsker, B.S. and Amir, E., Jul. 2007, Real-time Bayesian anomaly detection for environmental sensor data. In Proceedings of the Congress-International Association for Hydraulic Research (vol. 32, No. 2, p. 503). (Year: 2007).*

Mengshoel, O.J. et al., "Sensor Validation using Bayesian Networks" 9th International Symposium on Artificial Intelligence, Robotics, and Automation in Space, Feb. 2008. (pp. 1-8).

* cited by examiner

FIG.3

| d=6 Sensors | Sensed value | Parameter $\theta_i$ |
|---|---|---|
| Sensor 1 | $x_1$ | 1 (healthy) |
| Sensor 2 | $x_2$ | 1 (healthy) |
| Sensor 3 | $x_3$ | 1 (healthy) |
| Sensor 4 | $x_4$ | 1 (healthy) |
| Sensor 5 | $x_5$ | 0 (anomalous) |
| Sensor 6 | $x_6$ | 1 (healthy) |

|   | $\sigma^A$ | $\sigma^B$ |
|---|---|---|
| $\sigma_1$ | 1 | 1 |
| $\sigma_2$ | 2 | 4 |
| $\sigma_3$ | 3 | 2 |
| $\sigma_4$ | 4 | 5 |
| $\sigma_5$ | 5 | 3 |
| $\sigma_6$ | 6 | 6 |

DETECTING ANOMALOUS SENSORS

BACKGROUND

Technical Field

The present invention relates to detecting anomaly sensors.

Description of the Related Art

Detection of anomaly sensors is important in a variety of technical fields. It is often costly or almost impossible to monitor a great number of sensors with human eyes. Existing methods are computationally expensive, requiring lots of time, resources, or both, and do not indicate the degree of anomaly in an absolute sense.

SUMMARY

It is an object of an aspect of the innovations herein to provide anomaly sensor detection capable of overcoming the above drawbacks accompanying the related art. The above and other objects can be achieved by combinations described in the claims. According to a first aspect of the innovations, an apparatus may include a processor and one or more computer readable mediums collectively including instructions that, when executed by the processor, cause the processor to obtain a plurality of healthy sensor data, wherein each of the healthy sensor data includes a plurality of sensed values of a corresponding sensor among a plurality of sensors in normal operation, generate a healthy data distribution of at least two sensors among the plurality of sensors based on the plurality of healthy sensor data, and generate a function of a parameter probability distribution of the plurality of sensors under the condition of sensor data of the plurality of sensors based on the healthy data distribution, each parameter indicating whether the corresponding sensor is healthy or anomalous. According to a first aspect of the innovations, the apparatus may enable automated detection of anomalous sensors in an absolute and time and/or resource efficient manner.

The first aspect may also include a computer-implemented method including operations performed by the apparatus, and a computer program product comprising a computer readable storage medium having program instructions embodied therewith, the program instructions executable to perform the operations performed by the apparatus.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 3 shows a table of parameters and values of a plurality of sensors, according to an embodiment of the present invention.

DETAILED DESCRIPTION

Hereinafter, embodiments of the present invention will be described. The embodiments do not limit the invention according to the claims, and not all the combinations of the features described in the embodiments are necessarily essential to means provided by aspects of the invention.

Figure 1:
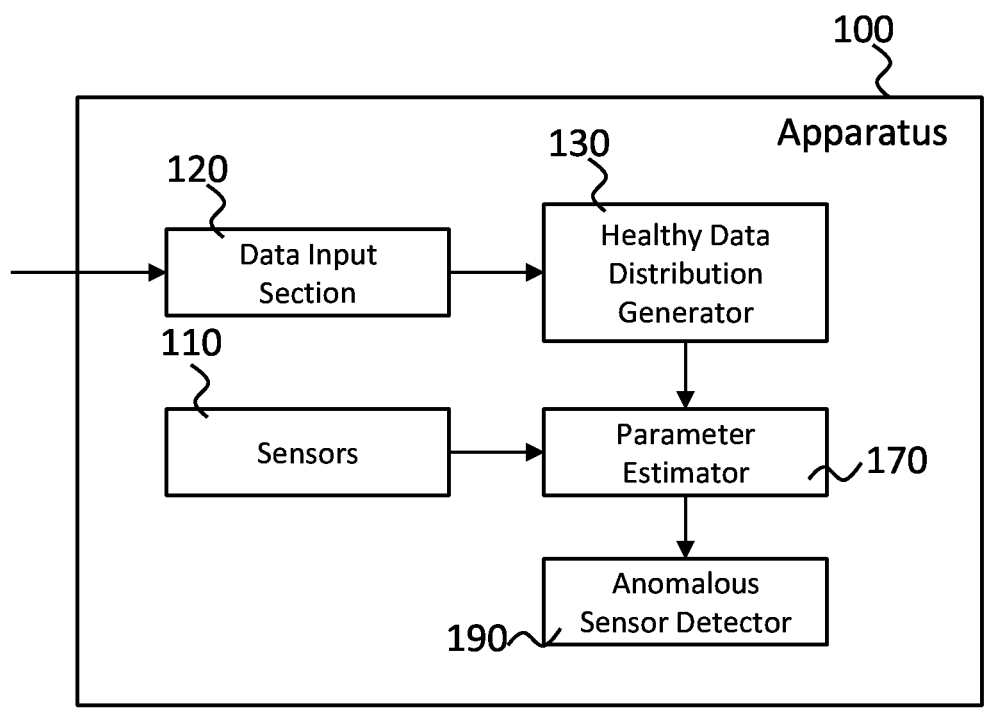
FIG. 1 shows an exemplary configuration of the apparatus 100, according to an embodiment of the present invention.

FIG. 1 shows an exemplary configuration of an apparatus 100, according to an embodiment of the present invention. The apparatus 100 may detect an anomalous sensor from a plurality of sensors based on a density model.

The apparatus 100 may comprise a processor, one or more computer readable mediums collectively including instructions, and a plurality of sensors 110. The instructions, when executed by the processor, cause the processor to operate as a plurality of operation sections. Thereby, the apparatus 100 may be regarded as comprising a data input section 120, a healthy data distribution generator 130, a parameter estimator 170, and an anomalous sensor detector 190.

The plurality of sensors 110 may detect physical quantities, such as temperature, light, pressure, sound and the like, and output a plurality of sensor data. Each of the plurality of the sensor data may include a plurality of sensed values of a corresponding sensor.

The plurality of sensors 110 may include one or more of sensors that temporarily or permanently output anomalous sensor data, and may be referred to as "anomalous sensors." Therefore, the plurality of sensor data may include one or more of anomalous sensor data. The plurality of sensors 110 may provide the parameter estimator 170 with the sensed values of the sensor data. In one embodiment, the plurality of sensors 110 may provide the parameter estimator 170 with a new sensor data.

The data input section 120 may obtain a plurality of healthy sensor data. The plurality of healthy sensor data may not include data from anomalous sensors, and values thereof can be regarded as normal. Each of the healthy sensor data may include a plurality of sensed values of a corresponding sensor among a plurality of sensors in normal operation. The plurality of healthy sensor data may be used as training data of the apparatus 100. The data input section 120 may provide the healthy data distribution generator 130 with the plurality of healthy sensor data.

The healthy data distribution generator 130 may generate a healthy data distribution of at least two sensors among the plurality of sensors based on the plurality of healthy sensor data. In one embodiment, the healthy data distribution generator 130 may generate a plurality of the healthy data distributions, corresponding to a plurality of pairs of two healthy sensors. The healthy data distribution generator 130 may provide the parameter estimator 170 with the healthy data distribution.

The parameter estimator 170 may generate a parameter probability distribution from the healthy data distribution received from the healthy data distribution generator 130.

The parameter estimator 170 may further estimate a score of each parameter from the new sensor data, based on the generated parameter probability distribution. Each parameter of the plurality of parameters may indicate whether the corresponding sensor is healthy or anomalous. Each score represents a degree of anomaly of each sensor. The parameter estimator 170 may provide the anomalous sensor detector 190 with the estimated score.

The anomalous sensor detector 190 may detect an anomalous sensor from the plurality of sensors 110 by comparing the score of each parameter with a threshold value. In one embodiment, the anomalous sensor detector 190 may determine that a sensor is anomalous if the score corresponding to the sensor exceeds the threshold value.

As described in relation with FIG. 1, the apparatus 100 may generate a healthy data distribution of sensor data of the healthy sensors, and then may estimate the score representing a probability of anomaly of a sensor based on the healthy data distribution. Thereby, the apparatus 100 may determine whether each sensor of the plurality of sensors 110 is anomalous in an absolute sense, since the apparatus 100 can evaluate a probability density of a sensor data against the healthy data distributions.

Although the apparatus 100 comprises the plurality of sensors 110 in the embodiment of FIG. 1, the plurality of sensors may be implemented outside of the apparatus in other embodiments.

Figure 2:
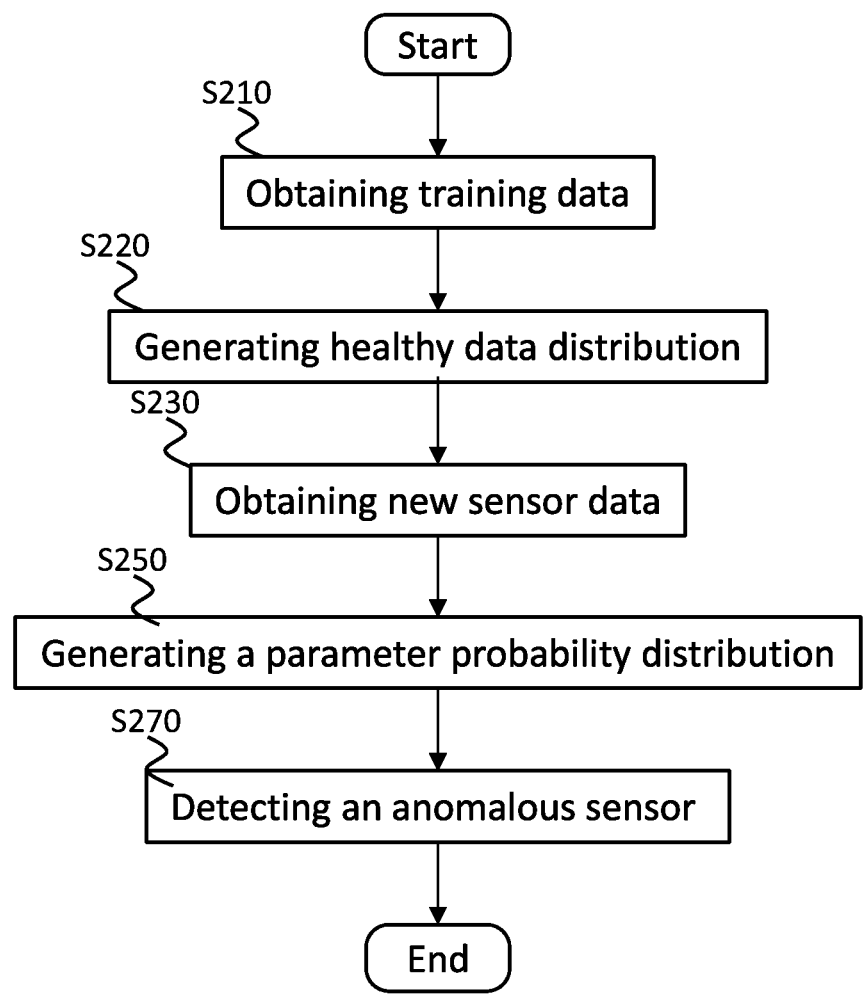
FIG. 2 shows an operational flow of an exemplary configuration of an apparatus, according to an embodiment of the present invention.

FIG. 2 shows an operational flow of an exemplary configuration of an apparatus, according to an embodiment of the present invention. The present embodiment describes an example in which an apparatus, such as the apparatus 100, performs the operations from S210 to S270, as shown in FIG. 2. FIG. 2 shows one example of the operational flow of the apparatus 100 shown in FIG. 1, but the apparatus 100 shown in FIG. 1 is not limited to using this operational flow, and the operational flow of FIG. 2 may be performed by other apparatuses.

First, at S210, a data input section, such as the data input section 120, may obtain a plurality of healthy sensor data. The data input section may obtain sensor data of only sensors among a plurality of sensors, such as the plurality of sensors 110, that are preliminarily labelled as healthy, or normal, as training data.

FIG. 3 shows a table of parameters and values of a plurality of sensors, according to an embodiment of the present invention. In this embodiment, the apparatus may include 6 sensors, which output sensed values $x_1, \ldots, x_6$ each. In this embodiment, sensor data of the sensors 1-4 and the sensor 6 are labelled as healthy, and sensor data of the sensor 5 is labelled as anomalous.

A parameter $\theta$, which indicates that each sensor is healthy or anomalous, is allocated to the plurality of sensors. The value of the parameters $\theta_1, \theta_2, \theta_3, \theta_4, \theta_6$ is 1, which indicates a healthy sensor, and the value of the parameter $\downarrow_5$ is 0, which indicates an anomalous sensor. In this embodiment, the data input section may obtain the sensor data of sensors 1-4 and 6 as one of the plurality of healthy sensor data at S210. The data input section may provide a healthy data distribution generator with the plurality of healthy sensor data. Next, at S220, the healthy data distribution generator may generate a healthy data distribution.

Figures 4, 5:
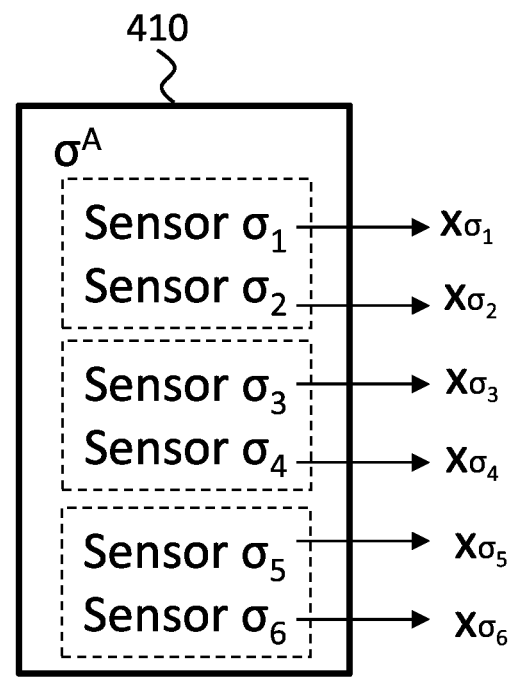
FIG. 4 shows pairs of the plurality of sensors, according to an embodiment of the present invention.
FIG. 5 shows a partial table of multiple partitions of a plurality of sensors, according to an embodiment of the present invention.

FIG. 4 shows pairs of a plurality of sensors 410, according to an embodiment of the present invention. The plurality of sensors 410 may be assigned a sensor number variable $\sigma_n$. In the embodiment of FIG. 4, 6 healthy sensors are assigned as sensor $\sigma_1, \sigma_2, \ldots, \sigma_6$. In the embodiment, the sensor $\sigma_n$ outputs sensor data $x_{on}$, as shown in FIG. 4.

In one embodiment, the 2i-th sensor and the (2i−1)-th sensor are paired, for each value of i, where i is a positive integer from 1 to D/2, where D is the number of sensors. In the embodiment of FIG. 4, the sensor $\sigma_1$ and the sensor $\sigma_2$ are paired, the sensor $\sigma_3$ and the sensor $\sigma_4$ are paired, and the sensor $\sigma_5$ and the sensor $\sigma_6$ are paired.

The pairing described in FIG. 4 is referred to as a partition $\sigma^A$. The 6 sensors can be grouped into pairs in different manners. For example, the i-th sensor and the (D-i+1)-th sensor may be paired, for each i, where D is a number of sensors, and i is an integer from 1 to D. All possible partitions may be referred to as a set $S_D$.

FIG. 5 shows a partial table of multiple partitions of a plurality of sensors, according to an embodiment of the present invention. In this embodiment, in which all 6 of the plurality of sensors is healthy, the partition $\sigma^A$ sets $\sigma_1, \sigma_2, \sigma_3, \sigma_4, \sigma_5, \sigma_6$, to 1, 2, 3, 4, 5, 6 and the partition $\sigma^B$ sets $\sigma_1, \sigma_2, \sigma_3, \sigma_4, \sigma_5, \sigma_6$ to 1, 4, 2, 5, 3, 6. The set $S_D$ may include other partitions.

The healthy data distribution of pairs of sensors may be expressed by $p(x_{o2i-1}, x_{o2i})$ which represents a probability that a sensed value $x_{o2i-1}$ of the healthy sensor $\sigma_{2i-1}$ and a sensed value $x_{o2i}$ of the healthy sensor $\sigma_{2i}$ are both observed, where i represent an integer between 1 and D/2, inclusive. The healthy data distribution generator may learn $p(x_{o2i-1}, x_{o2i})$ by a density estimation method such as the kernel density estimation, based on the healthy sensor data. Thereby, the healthy data distribution generator learns two dimensional densities $p(x_{o2i-1}, x_{o2i})$.

In the embodiment of FIGS. 4-5, the healthy data distribution generator may generate $p(x_1, x_2), p(x_3, x_4), p(x_{o5}, x_6)$ for the partition $\sigma^A$, and $p(x_1, x_4), p(x_2, x_5), p(x_{o3}, x_6)$ for the partition $\sigma^B$. The healthy data distribution generator may generate other $p(x_{o2i-1}, x_{o2i})$ for partitions included in the set $S_D$. The healthy data distribution generator may generate $p(x_i, x_j)$ for all or some of the possible pairs of healthy sensors $(x_i, x_j)$.

The healthy data distribution generator may also generate an anomalous data distribution of at least two sensors among the plurality of sensors. At least one of the at least two sensors is an anomalous sensor. In one embodiment, the healthy data distribution generator may generate the anomalous data distribution of a pair of sensors among the plurality of sensors. The anomalous data distribution of pairs of sensors may be expressed by $u(x_{o2i-1}, x_{o2i})$.

In one embodiment, the healthy data distribution generator may generate the anomalous data distribution $u(x_{o2i-1}, x_{o2i})$, which is approximated with a uniform distribution. In one embodiment, the healthy data distribution generator may obtain a sensor data from the anomalous sensor(s), and may generate the anomalous data distribution $u(x_{o2i-1}, x_{o2i})$ from the sensor data from the anomalous sensor(s). The healthy data distribution generator may provide a parameter estimator with the healthy data distribution $p(x_{o2i-1}, x_{o2i})$ and the anomalous data distribution $u(x_{o2i-1}, x_{o2i})$.

Next, at S230, a plurality of sensors such as the plurality of sensors 110 may obtain new sensor data $x_{new}$. The plurality of sensors may provide the parameter estimator with the new sensor data $x_{new}$. The plurality of sensors provides the new sensor data with the parameter estimator.

Next, at S250, the parameter estimator, such as the parameter estimator 170, may generate a function of a parameter probability distribution based on the healthy data distribution.

In order to explain the function of the parameter probability distribution, we first define the data distribution $p(x|\theta)$. The parameter probability distribution may be derived from the data distribution $p(x|\theta)$. The data distribution may be expressed by $p(x|\theta)$ as shown in a formula (1) below, where $x_{\sigma^*}$ represents a sensed value of $\sigma^*$-th sensor and $\theta_{\sigma^*}$ represents the parameter of the $\sigma^*$-th sensor.

$$p(x \mid \theta) := \frac{1}{|S_D|} \sum_{\sigma \in S_D} \prod_{i=1}^{D/2} p(x_{\sigma 2i-1}, x_{\sigma 2i})^{\theta_{\sigma 2i-1} \theta_{\sigma 2i}} u(x_{\sigma 2i-1}, x_{\sigma 2i})^{1-\theta_{\sigma 2i-1} \theta_{\sigma 2i}} \quad (1)$$

As the formula (1) indicates, when sensors $(x_{\sigma 2i-1}, x_{\sigma 2i})$ in each pair are both healthy, $p(x_{\sigma 2i-1}, x_{\sigma 2i})$ contributes to the data distribution instead of $u(x_{\sigma 2i-1}, x_{\sigma 2i})$, and when at least one sensor of each pair $(x_{\sigma 2i-1}, x_{\sigma 2i})$ is anomalous, $u(x_{\sigma 2i-1}, x_{\sigma 2i})$ contributes to the data distribution instead of $p(x_{\sigma 2i-1}, x_{\sigma 2i})$. For example, if the sensors 1-4 and 6 are healthy, and the sensor 5 is anomalous, then the data distribution $p(x_1, \ldots, x_6|\theta_1, \ldots, \theta_6=\{1, 1, 1, 1, 0, 1\})$ may be estimated with $\{p(x_1, x_2) \times p(x_3, x_4) \times u(x_5, x_6)\} + \{p(x_1, x_3) \times u(x_2, x_5) \times p(x_4, x_6)\} + \ldots$ for all partitions in the set $S_D$.

Here, the data distribution $p(x|\theta)$ is represented by the sum of exponentially many components in the formula (1). $p(x|\theta)$ of the formula (1) may be approximated into another formula in order to reduce the computation.

Let the (i, i')-th entry of the matrix $L(x) \in R^{D \times D}$ be $$L_{ii'}(x) := \frac{1}{D-1} \log q(x_i, x_{i'}) / u(x_i, x_{i'}).$$

The parameter probability distribution $p(\theta|x)$ is regarded as posterior distribution when x is regarded as an observation. $p(\theta|x)$ is expressed by the following formula (2) according to the Bayes rules:

$$p(\theta \mid x) \frac{p(x|\theta)p(\theta|\mu)}{\sum_{\theta' \in [0,1]^D} p(x|\theta')p(\theta'|\mu)} \quad (2)$$

In this embodiment, since the parameter estimator only uses two dimensional density estimation for pairs of sensors in the data distribution $p(x|\theta)$, and does not use high dimensional density estimation such as $p(x_\theta)$ for all sensors, the parameter estimator can avoid computationally costly estimation of $p(x_\theta)$.

The parameter estimator may approximate the parameter probability distribution $p(\theta|x)$ with a Bernoulli distribution. In one embodiment, a prior distribution $p(\theta|\mu)$ in the parameter probability distribution $p(\theta|x)$ of the formula (2) may be estimated by an anomaly rate parameter $\mu_i$. In this embodiment, the parameter estimator may estimate the parameter probability distribution $p(\theta|x)$ from the new sensor data by using a Bernoulli distribution as a prior distribution of the plurality of parameters. For example, a prior distribution of the parameter $\theta$ is expressed by the following Bernoulli distribution (3):

$$p(\theta|\mu) = \prod_{i=1}^{D} \mu_i^{\theta_i}(1-\mu_i)^{1-\theta_i} \quad (3)$$

The anomaly rate parameter $\mu_i$ may be set to a predetermined value. The parameter estimator may estimate the formula (2) by using the data distribution $p(x|\theta)$ of the formula (1) and $p(\theta|\mu)$ of the formula (3).

The parameter probability distribution $p(x|\theta)$ may be further approximated into another formula. In one embodiment, the posterior distribution may be approximated with the Bernoulli distribution $p(\theta|v)$ as shown in $p(\theta|x) \approx p(\theta|v) := \prod_{i=1}^{D} v_i^{\theta_i}(1-v_i)^{1-\theta_i}$.

The parameter estimator may find the parameter v that best approximates the posterior. Finding a value of the parameter v amounts to finding the minimizer of the KL-divergence $D_{KL}[p(\theta|v) \| p(\theta|x)]$. Further approximation can be performed on this KL-divergence. While the exact computation of $p(x|\theta)$ in the KL-divergence requires exponential iterations, the parameter estimator may use its upper bound as an alternative object function. The parameter estimator may solve a problem as shown in a formula (4):

$$v = \underset{v \in [0,1]^D}{\operatorname{argmin}} \sum_{i=1}^{D} \left\{ v_i \log \frac{v_i}{\mu_i} + (1-v_i) \log \frac{1-v_i}{1-\mu_i} \right\} - \frac{1}{2} v^\top L(x) v \quad (4)$$

The parameter estimator may generate a function to estimate the parameter probability distribution $P(\theta|x)$ from the new sensor data by using a coordinate descent method. In one embodiment, the parameter estimator may generate the function to solve the formula (4) by using the coordinate decent method. In each iteration in the formula (4), the parameter $v_{i'}(i' \neq i)$ may be fixed, and the parameter estimator may optimize only $v_i$. The partial problem on $v_i$ is given by:

$$\operatorname{argmin}_{v_i} v_i \log \frac{v_i}{\mu_i} + (1-v_i) \log \frac{1-v_i}{1-\mu_i} - c_i v_i, \quad (5)$$

where $c_i := \sum_{i'=1; i \neq i'}^{D} L(x)_{ii'} v_{i'}$

Hence, the parameter estimator may estimate the optimal $v_i$ by $$v_i = \left(1 + e^{-c_i} \frac{1-\mu_i}{\mu_i}\right)^{-1}.$$

Here, the parameter estimator may estimate a score of each parameter $\theta$ from new sensor data $X_{new}$ obtained at S230. In one embodiment, the parameter estimator may obtain a value of $v_i (i \in D)$ of the formula (04)-(5) from a value of the new sensor data $x_{new}$, and then estimate a parameter probability distribution $p(\theta_i|x_{new})$ based on the approximation of the Bernoulli distribution from the new sensor data xnew as the score of each parameter $\theta$.

Each score $s_i := p(\theta_i|x_{new})$ may represent a probability that the i-th sensor is anomalous. For example, if a value of $p(\theta_i 0|x_{new})$ is 0.6, then the probability that the i-th sensor is anomalous is 60%.

In one embodiment, the parameter estimator may estimate the score $p(\theta_i=1|x_{new})$, which represents a probability that each sensor $\theta_i$ is healthy. The parameter estimator may provide an anomalous sensor detector with the estimated score.

Next, at S270, the anomalous sensor detector, such as the anomalous sensor detector 190, may detect the anomalous sensor based on the scores of each sensor. In one embodiment, the anomalous sensor detector may compare the score $s_i$ of the i-th sensor with a threshold value. If the score $s_i$ exceeds the threshold value, then the anomalous sensor detector may determine that the i-th sensor is anomalous, or not healthy.

As described in relation to FIGS. 2-5, the apparatus may estimate a degree of anomaly of sensors in an absolute sense. In particular, the apparatus may estimate a probability that each sensor is anomalous by utilizing the two dimensional probability density and the Bayesian model. In some embodiments, the apparatus may identify anomalous sensors without setting particular conditions of anomalous sensors, such as a condition that detects anomalous sensors when a sensed value is within a range. Furthermore, the apparatus may reduce computation required for the estimation by utilizing a variety of approximation methods.

Figure 6:
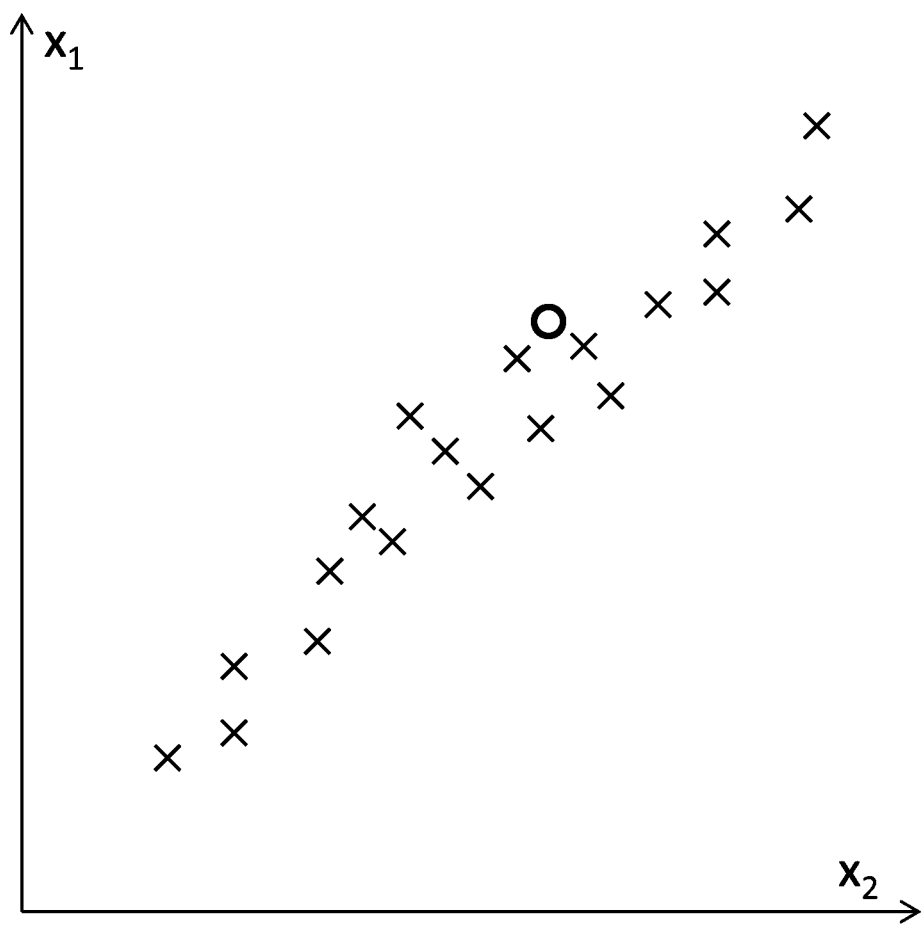
FIG. 6 shows one example of a relationship of sensor data between two sensors, according to an embodiment of the present invention.

FIG. 6 shows one example of a relationship of sensor data between two sensors, according to an embodiment of the present invention. Points "X" in the graph represent position coordinates corresponding to sensor data xi of a sensor 1 and sensor data $x_2$ of a sensor 2 in training data. A point "O" in the graph represents a position coordinate corresponding to new sensor data of the sensor 1 and sensor data $x_2$ of the sensor 2. A probability $p(x_1, x_2)$ corresponding to the area where points X are aggregated may be high.

As described in FIG. 6, the new sensor data "O" is located generally on an area where the probability $p(x_1, x_2)$ is high. Therefore, the apparatus may determine that the new sensor data is healthy in relation to the sensor 1 and the sensor 2.

Figure 7:
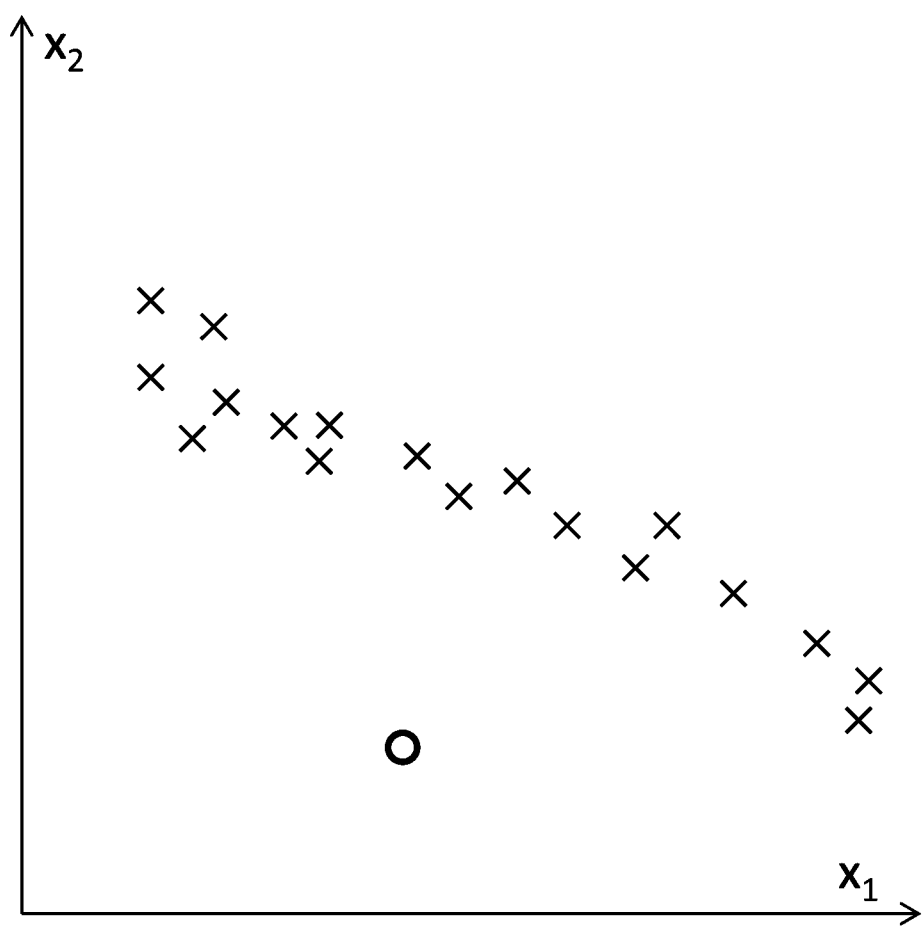
FIG. 7 shows another example of a relationship of sensor data between two sensors, according to an embodiment of the present invention.

FIG. 7 shows another example of a relationship of sensor data between two sensors, according to an embodiment of the present invention. As shown in FIG. 7, the new sensor data "O" is located generally apart from an area where the probability $p(x_1, x_2)$ is high. Therefore, the apparatus may determine that the new sensor data is anomalous in relation to the sensor 1 and the sensor 2.

In the aforementioned embodiments, the healthy data distribution generator may generate the healthy data distribution of two sensors. In one embodiment, the healthy data distribution generator may generate the healthy data distribution of one or more than two sensors. In one embodiment, the healthy data distribution generator may generate the data distribution $p(x|\theta)$ as shown in the formula (6):

$$p(x|\theta) := \sum_{m=1}^{D} \frac{\alpha_m}{|S_D^m|} \sum_{\sigma \in S_D^m} \prod_{i=1}^{|\sigma|} p(x_{\sigma_i})^{\prod_{j \in \sigma_i} \theta_j} u(x_{\sigma_i})^{1-\prod_{j \in \sigma_i} \theta_j}, \quad (6)$$

where $S^m_D$ represents all possible size m partitions of sensors, $p(x_{\sigma i})$ representing healthy data distribution on the sensor subset $\sigma_i$, and $u(x_{\sigma i})$ represents anomalous data distribution (e.g., uniform distribution) on the sensor subset $\sigma_i$. The values of $\alpha_m$ may be preliminary determined by a user, or learned from healthy sensor data.

Figure 8:
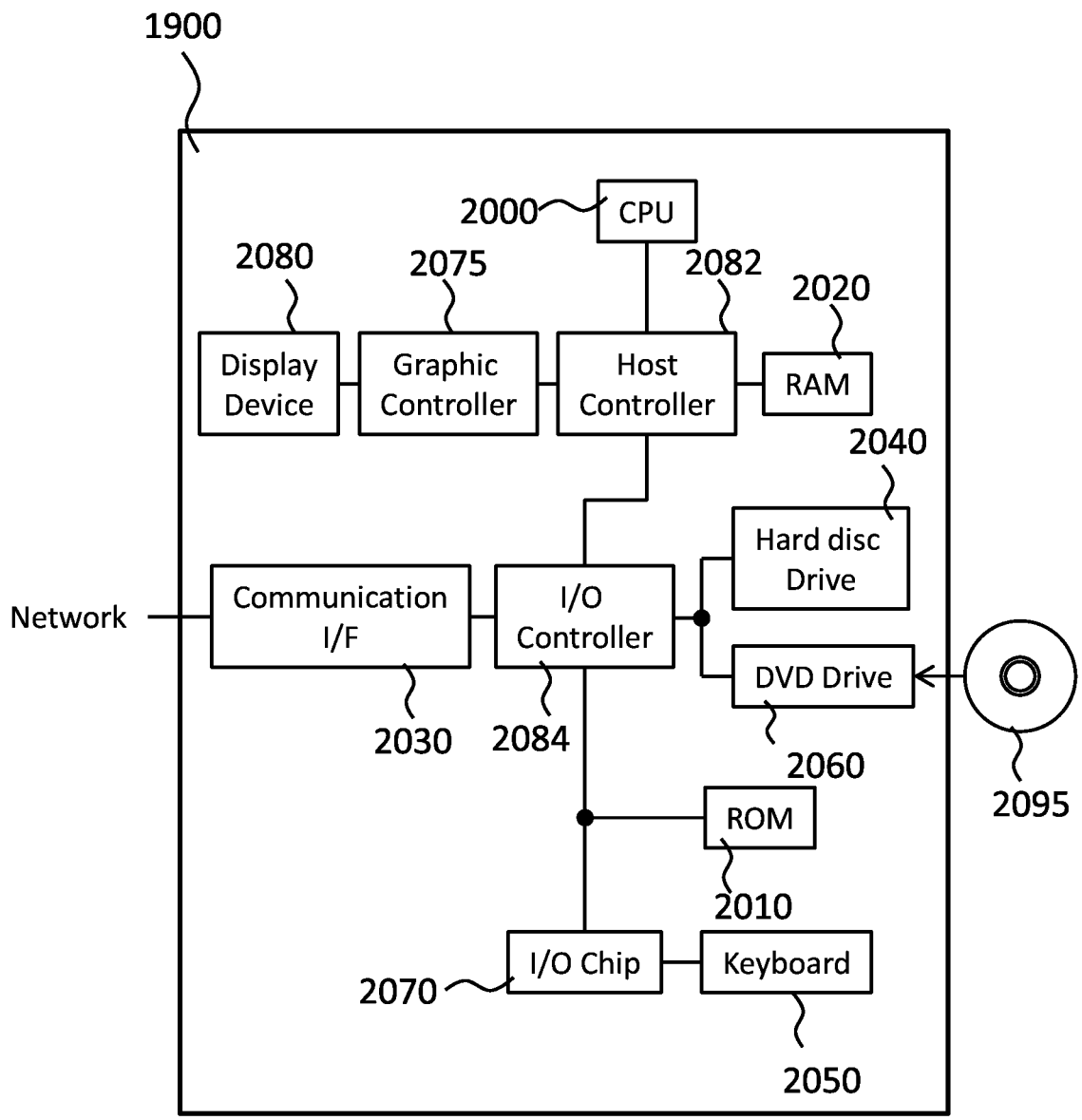
FIG. 8 shows a computer, according to an embodiment of the present invention.

FIG. 8 shows an exemplary configuration of a computer 1900 according to an embodiment of the invention. The computer 1900 according to the present embodiment includes a CPU 2000, a RAM 2020, a graphics controller 2075, and a display apparatus 2080, which are mutually connected by a host controller 2082. The computer 1900 also includes input/output units such as a communication interface 2030, a hard disk drive 2040, and a DVD-ROM drive 2060, which are connected to the host controller 2082 via an input/output controller 2084. The computer also includes legacy input/output units such as a ROM 2010 and a keyboard 2050, which are connected to the input/output controller 2084 through an input/output chip 2070.

The host controller 2082 connects the RAM 2020 with the CPU 2000 and the graphics controller 2075, which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from a DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 may cause the computer 1900 to function as an apparatus, such as the apparatus 100 of FIG. 1. The program or module acts on the CPU 2000, to cause the computer 1900 to function as a section, component, element such as each element of the apparatus 100 of FIG. 1 (e.g., the data input section 120, the healthy data distribution generator 130, the parameter estimator 170, the anomalous sensor detector 190 and the like).

The information processing described in these programs is read into the computer 1900 such as the apparatus 100 of FIG.1, to function as the obtaining section, which is the result of cooperation between the program or module and the above-mentioned various types of hardware resources. Moreover, the apparatus is constituted by realizing the operation or processing of information in accordance with the usage of the computer 1900.

For example, in response to communication between the computer 1900 and an external device, the CPU 2000 may execute a communication program loaded onto the RAM 2020, to instruct communication processing to a communication interface 2030, based on the processing described in the communication program.

The communication interface 2030, under control of the CPU 2000, reads the transmission data stored on the transmission buffering region provided in the recording medium, such as a RAM 2020, a hard disk drive 2040, or a DVD- ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060(DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc.

Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from a memory such as the RAM 2020, which includes various types of operations, processing of information, condition judging, search/replace of information, etc., as described in the present embodiment and designated by an instruction sequence of programs, and writes the result back to the memory such as the RAM 2020. For example, if performing condition judging, then the CPU 2000 may judge whether each type of variable shown in the present embodiment is larger, smaller, no smaller than, no greater than, or equal to the other variable or constant, and if the condition judging results in the affirmative (or in the negative), then the process branches to a different instruction sequence, or calls a sub routine.

In addition, the CPU 2000 may search for information in a file, a database, etc., in the recording medium. For example, if a plurality of entries, each having an attribute value of a first attribute is associated with an attribute value of a second attribute, are stored in a recording apparatus, then the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include the DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium, which may implement the storage section, may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order. As made clear from the above, the embodiments of the present invention can be used to realize an apparatus, a method, and a computer program product for detecting anomalous sensors.

The invention claimed is:

1. An apparatus comprising:
a plurality of sensors;
a processor coupled to the plurality of sensors; and
one or more computer readable mediums collectively including instructions that, when executed by the processor, cause the processor to
monitor the plurality of sensors,
obtain a plurality of healthy sensor data, each of the healthy sensor data includes a plurality of sensed values of a corresponding sensor among the plurality of sensors in normal operation and does not include data from anomalous sensors,
generate a healthy data distribution of at least two sensors among the plurality of sensors corresponding to the plurality of healthy sensor data, and
generate a function of a parameter probability distribution of sensor parameters of the plurality of sensors under a condition of sensor data based on the healthy data distribution, each parameter indicating whether the corresponding sensor is healthy or anomalous.

2. The apparatus of claim 1, wherein the instructions further cause the processor to:
estimate a score of each parameter from a new sensor data.

3. The apparatus of claim 2, wherein the instructions further cause the processor to estimate a parameter probability distribution from the new sensor data.

4. The apparatus of claim 3, wherein the instructions further cause the processor to approximate the parameter probability distribution with a Bernoulli distribution.

5. The apparatus of claim 4, wherein the instructions further cause the processor to estimate the parameter probability distribution from the new sensor data by using a Bernoulli distribution as a prior distribution of the plurality of parameters.

6. The apparatus of claim 5, wherein the instructions further cause the processor to estimate the parameter probability distribution from the new sensor data by using a coordinate descent method.

7. The apparatus of claim 2, wherein each score represents at least one probability that the corresponding sensor is anomalous.

8. The apparatus of claim 2, wherein the instructions further cause the processor to detect an anomalous sensor by comparing the score of each parameter with a threshold value.

9. The apparatus of claim 1, wherein the instructions further cause the processor to generate the function of a parameter probability distribution further based on an anomalous data distribution, wherein the anomalous data distribution is approximated with a uniform distribution.

10. The apparatus of claim 1, wherein the instructions further cause the processor to generate the healthy data distribution of a pair of sensors according to a partition of the plurality of sensors wherein the distribution is two dimensional.

11. The apparatus of claim 1, wherein each sensor of the plurality of sensors is configured to sense a physical quantity.

12. A computer-implemented method comprising:
monitoring a plurality of sensors to obtain a plurality of healthy sensor data, each of the healthy sensor data includes a plurality of sensed values of a corresponding sensor among a plurality of sensors in normal operation and does not include data from anomalous sensors;
generating a healthy data distribution of at least two sensors among the plurality of sensors corresponding to the plurality of healthy sensor data; and
generating a function of a parameter probability distribution of sensor parameters of the plurality of sensors under a condition of sensor data of the plurality of sensors based on the healthy data distribution, each parameter indicating whether the corresponding sensor is healthy or anomalous.

13. The computer-implemented method of claim 12, further comprising:
estimating a score of each parameter from a new sensor data.

14. The computer-implemented method of claim 13, further comprising:
estimating a parameter probability distribution from the new sensor data.

15. The computer-implemented method of claim 14, further comprising:
approximating the parameter probability distribution with a Bernoulli distribution.

16. The computer-implemented method of claim 15, further comprising:
estimating the parameter probability distribution from the new sensor data by using a Bernoulli distribution as a prior distribution of the plurality of parameters.

17. A computer program product comprising including one or more computer readable mediums collectively including instructions that, when executed by the processor, cause the processor to:
monitor a plurality of sensors to obtain a plurality of healthy sensor data, each of the healthy sensor data includes a plurality of sensed values of a corresponding sensor among a plurality of sensors in normal operation and does not include data from anomalous sensors;
generate a healthy data distribution of at least two sensors among the plurality of sensors corresponding to the plurality of healthy sensor data; and
generate a function of a parameter probability distribution of sensor parameters of the plurality of sensors under a condition of sensor data of the plurality of sensors based on the healthy data distribution, each parameter indicating whether the corresponding sensor is healthy or anomalous.

18. The computer program product of claim 17, wherein the instructions further cause the processor to:
estimate a score of each parameter from a new sensor data.

19. The computer program product of claim 18, wherein the instructions further cause the processor to estimate a parameter probability distribution from the new sensor data.

20. The computer program product of claim 19, wherein the instructions further cause the processor to approximate the parameter probability distribution with a Bernoulli distribution.

* * * * *